(12) United States Patent
MacManus

(10) Patent No.: US 6,588,367 B1
(45) Date of Patent: Jul. 8, 2003

(54) NO DOG CAT FEEDER

(76) Inventor: Angus MacManus, 2411 Van Dyke Ave., Raleigh, NC (US) 27607

( * ) Notice: Subject to any disclaimer, the term of this patent is extended or adjusted under 35 U.S.C. 154(b) by 0 days.

(21) Appl. No.: 10/086,824

(22) Filed: Mar. 4, 2002

(51) Int. Cl.[7] .......................... A01K 1/10; A01K 39/00; B26D 5/42
(52) U.S. Cl. .................. 119/51.01; 229/198.1; 119/61
(58) Field of Search .............. 119/51.01, 59, 119/61, 63; 43/60, 65; 229/198.1, 124, 125, 125.39, 126, 127, 132

(56) References Cited

U.S. PATENT DOCUMENTS

| | | | | |
|---|---|---|---|---|
| 1,025,037 A | * | 4/1912 | Walter | 229/198.1 |
| 2,386,905 A | * | 10/1945 | Meitzen | 229/198.1 |
| 3,270,943 A | * | 9/1966 | Polenghi | 229/198.1 |
| 3,303,600 A | * | 2/1967 | Freeman | 119/63 |
| 3,505,977 A | * | 4/1970 | Mancini | 119/61 |
| 3,695,505 A | * | 10/1972 | Wolf | 229/126 |
| 3,738,329 A | * | 6/1973 | Schweitzer | 119/63 |
| 3,776,108 A | * | 12/1973 | Nock | 229/114 |
| 4,029,051 A | * | 6/1977 | McKinney | 119/61 |
| 4,036,178 A | | 7/1977 | Lee et al. | |
| 5,048,463 A | | 9/1991 | Wilson et al. | |
| 5,546,894 A | * | 8/1996 | St-Pierre | 119/61 |
| 6,349,671 B1 | | 2/2002 | Lewis et al. | |
| 6,360,689 B1 | | 3/2002 | Weinert | |
| 6,360,698 B1 | * | 3/2002 | Stapelfeld et al. | 119/51.01 |
| 2001/0032594 A1 | | 10/2001 | Bickley | |

FOREIGN PATENT DOCUMENTS

EP          390 245    *   3/1990   ................... 119/61

* cited by examiner

*Primary Examiner*—Charles T. Jordan
*Assistant Examiner*—Elizabeth Shaw

(57) ABSTRACT

This invention is a small animal feeder that physically restricts access to food by medium to large size animals. It is comprised of a 12 inch cube of cardboard with an extra elongated front forming a vertical 3½ inch silt. A plastic feeder tray filled with food is inserted inside. It is the size and shape of the front opening that functions as both the barrier to medium to large size animals while allowing unlimited access to small animals. Currently used or patented pet feeders do not discriminate between medium to large size animals and smaller animals where access to dispensed food is concerned.

19 Claims, 3 Drawing Sheets

NO DOG CAT FEEDER

BACKGROUND

The field of endeavor to which this invention pertains is that of accessories for small animals and pets, and more specifically, a feeding system for smaller animals that can discriminate based on animal size to physically prevent access to the food by larger animals.

A pet owner who owns both larger and smaller animals, e.g., dogs and cats, encounters problems with their dogs eating their cat's food. Many pet owners like to leave cat food available to their cats 24 hours a day while feeding their dogs only once or twice a day. If cat food is left accessible to a dog, the dog is likely to eat the cat's food against the owner's wishes.

Traditional gravity operated cat feeders or any other mechanically operated cat feeders do not address this problem. For Example, U.S. Pat. No. 5,048,463 to Wilson, et al. will distinguish between large and small animals with an infrared detector but will not prevent a dog from taking a cat's food after the food is dispensed.

SUMMARY

An object of this invention is to provide a small animal feeder that discriminates according to size such that the food therein is not accessible by medium to large size animals.

According to one embodiment, the feeder's housing is comprised of a modified cardboard box to form a box-like shape having an elongated front with a narrow vertical slit shaped opening narrow enough to allow entry by smaller animals, such as cats, beyond the animal's shoulder region while preventing medium to large size animals, such as dogs, from accessing the inside of the housing beyond the animal's shoulder region. Inside the housing is a removable food tray where food is placed and replenished by hand. The tray is preferably removed and replaced in the housing via the narrow vertical slit shaped opening.

Alternatively, the housing may be made of a material other than cardboard, such as vinyl, plastic, wood, or metal.

The invention advantageously gives the owner of both pet cats and medium to large size dogs the ability to make cat food available to the cats 24 hours a day without the cat food being consumed by the dogs.

The materials used in this invention are comparatively simple, inexpensive, and easy to manufacture. The product can be assembled by the consumers, i.e., sold in a kit form. There is no required electrical devices, thereby simplifying the invention's manufacture and use.

DETAILED DESCRIPTION

The housing of the invention defines an enclosed space that medium to large size animals can not access but can be accessed by smaller animals freely. The space can have multiple uses but the preferred embodiment of the invention described herein is sized accordingly to define a feeder that can not be accessed by medium to large size dogs while allowing free access to cats.

Figure 2:
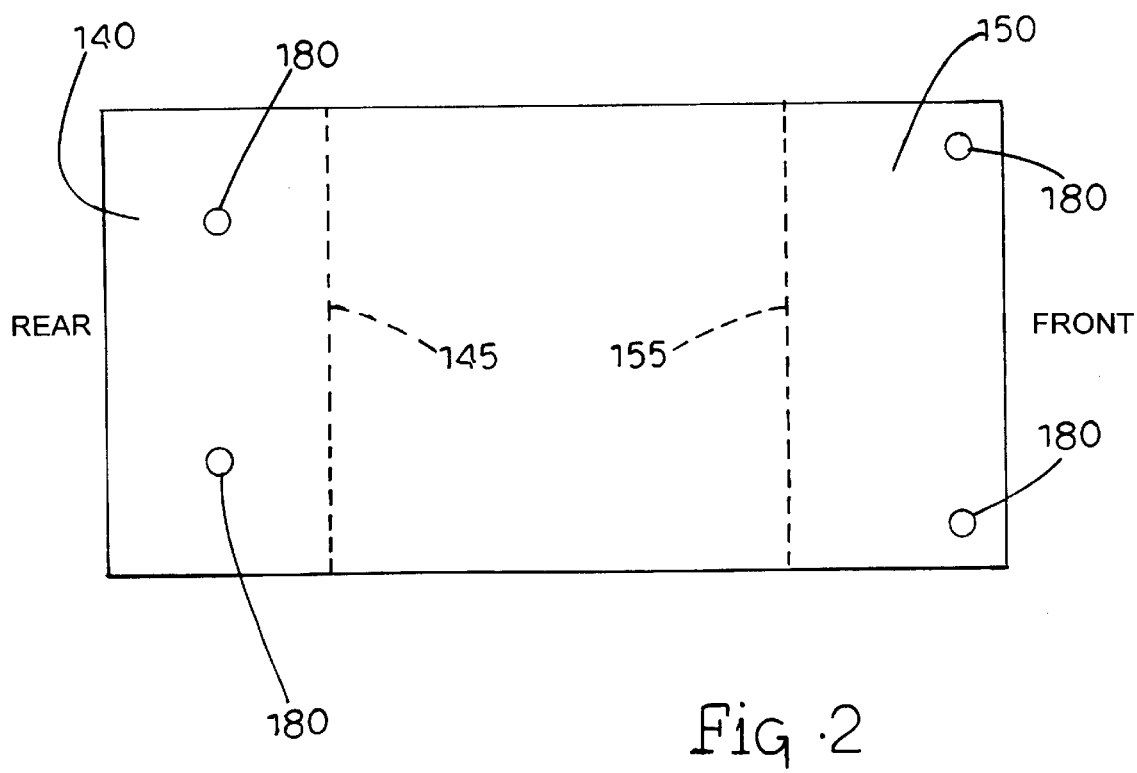
FIG. 2 is a side view illustrating the unassembled housing of the feeder according to an embodiment of the invention, where dashed lines show the placement of creases.
Figure 3:
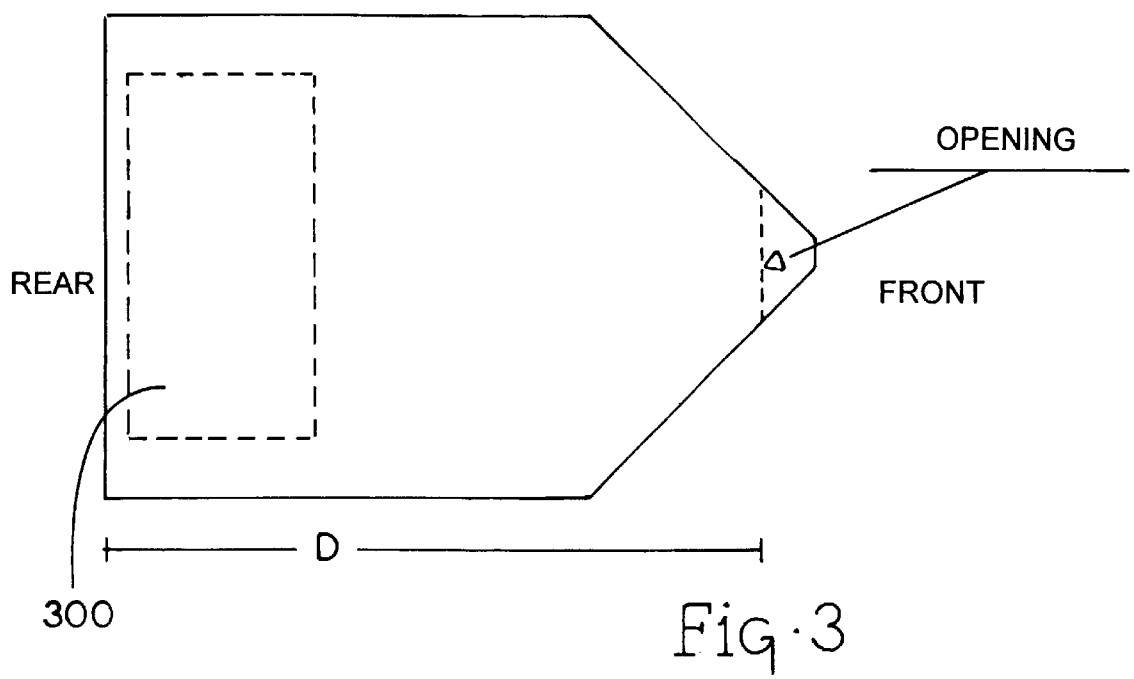
FIG. 3 is a top view illustrating the assembled housing of the feeder and food tray placement according to an embodiment of the invention.
Figure 4:
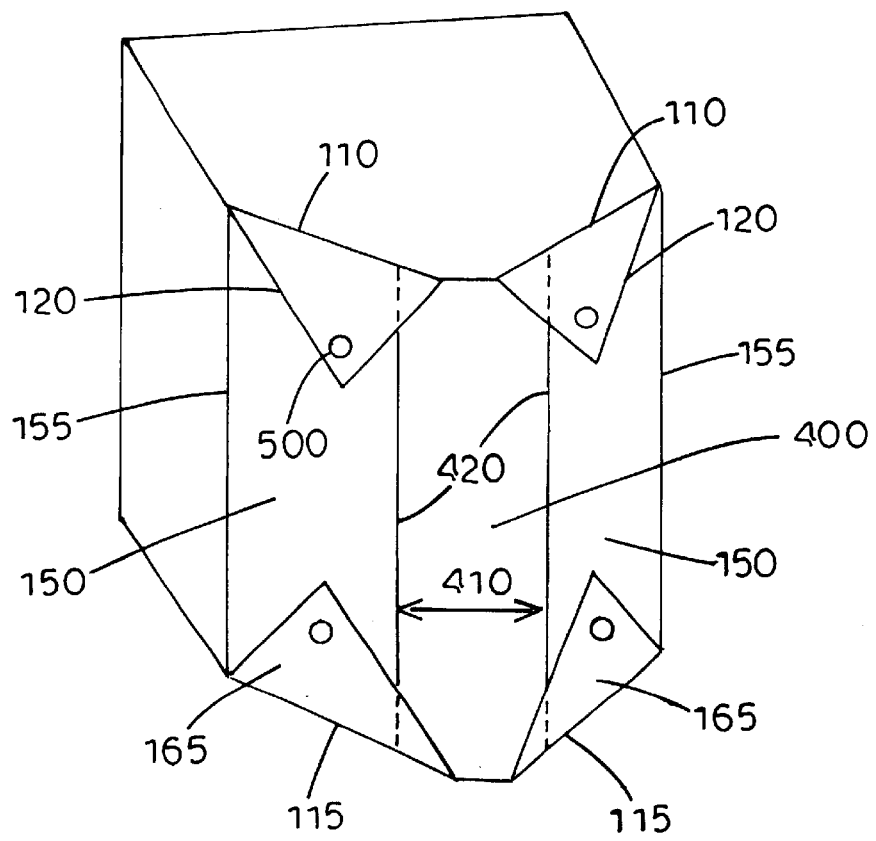
FIG. 4 is front view illustrating the assembled housing of the feeder according to an embodiment of the invention.

In the preferred embodiment illustrated in FIGS. 1–4, with particular reference to FIG. 4, the feeder housing is preferably comprised of ⅛ thick inch cardboard folded into a box with an additional elongated front which forms a narrow vertical slit shaped opening 400. It is this narrow vertical slit shaped front opening 400 that functions as a physical barrier for medium to large size dogs while allowing cats free access to food placed inside the feeder.

Figure 1:
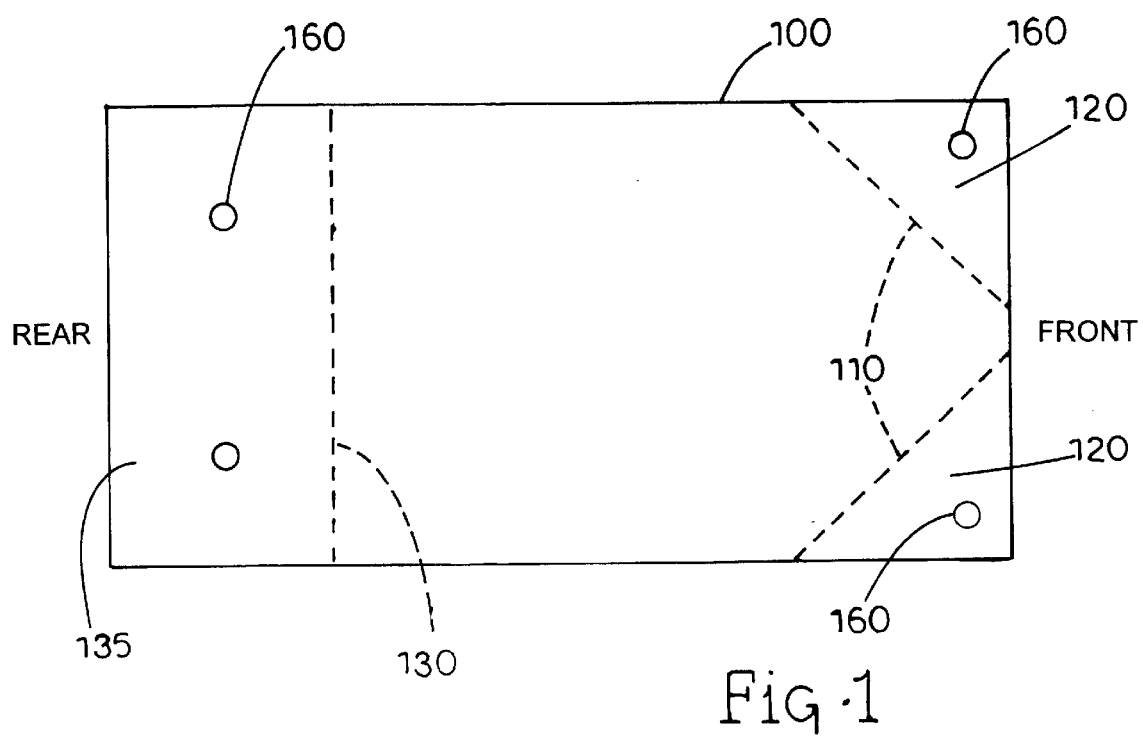
FIG. 1 is a top view illustrating the unassembled housing of the feeder according to an embodiment of the invention, where dashed lines show the placement of creases.

Referring to the top view illustration of FIG. 1, the cardboard 100 can be manufactured according to conventional cardboard box manufacturing methods, with the modifications noted herein. Conventional creases 130 for the top rear flap 135 and bottom rear flap (not shown) are applied to the cardboard during the cardboard box manufacturing process. The cardboard 100 includes applied diagonal creases 110 in the front end at the top and bottom (bottom not shown) that are oriented such that triangular sub-flaps 120 are formed. These additional creases may be applied during manufacture or as a modification thereafter. Holes 160 are made in the front 120 and rear 135 flaps for fastening, as shown. Two additional flaps with holes at the bottom front are not visible in FIG. 1.

Referring also to the side view illustration of FIG. 2, conventional creases 145, 155 for the side rear flap 140 and side front flap 150, respectively, are also applied to the cardboard during the cardboard box manufacturing process. Holes 180 are made in the front 150 and rear 140 flaps for fastening, as shown. Two additional flaps with holes at the other side are not visible in FIG. 2.

Figure 5B:
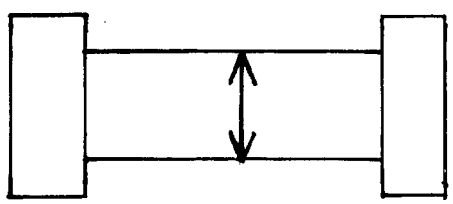
FIGS. 5A and 5B illustrate an exemplary fastening device for the housing according to an embodiment of the invention.
Figure 5A:
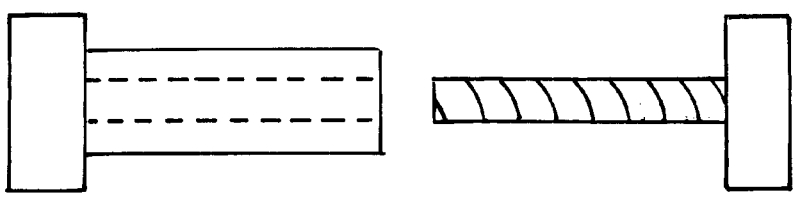

During folding, the holes 160 in the top and bottom flaps align with corresponding holes 180 in the side flaps so that a fastener can be asserted through both holes to hold the flaps together. For example, the nylon fastener-binders, shown in FIGS. 5A and 5B, are preferably used to bind the front and rear flaps. These fasteners are used in the preferred embodiment, but someone of ordinary skill in the art will appreciate that many other affixing means can be employed. For example, snaps may be secured to the flaps instead and used for fastening the flaps by snapping the corresponding male and female cooperating snap members together. Alternatively, another affixing means such as adhesive or Velcro can be used to fasten the flaps together.

As illustrated in FIG. 4, a food tray 300 can be placed near the rear of the assembled feeder housing. The food tray 300 can be comprised of plastic or metal materials. It should be noted, however, the food tray is not an essential feature of the invention. The food placement within the housing, however, is more important.

During assembly of the housing, the rear flaps 135 and 140 of the housing are folded along the respective creases 130 and 145 according to conventional cardboard box folding techniques so that a flat surface is formed at the rear of the housing. This being done, the respective holes for the top 160 and sides 180 on each of the four flaps cooperatively align. The fasteners are then placed through the holes and secured so that there are four fasteners installed at the rear of the housing.

The front of the feeder is assembled by folding the two front side flaps 150 along their creases 155 toward each other (see also FIG. 4). The two top front sub-flaps 120 are folded down along the respective creases 110 so that these fold over the front side flaps 150. The holes 160, 180 in the top and side flaps are then aligned. The top. front sub-flaps 120 point directly down forming a 90 degree angle at the creases 110. While the holes are held in alignment, the fasteners 500 are placed through the holes and secured.

The two bottom front sub-flaps 165 are folded up along their creases over the front side flaps 150, forming a 90 degree angle at the creases 115. The holes 160, 180 of the bottom and front side flaps are aligned and the fasteners 500 are secured.

The housing is then fully assembled as shown in the front view illustration of FIG. 4. The assembled housing has a box-like shape having an elongated front with a narrow vertical slit-shaped opening, or aperture. The aperture dimensions are selected such that the width 410 is wide enough to allow entry by smaller animals, such as cats, beyond the animal's shoulder region, i.e., allow at least one front leg to enter the inner space of the housing. The width 410, however, is also selected such that medium to large size animals, e.g., dogs, are prevented from accessing the inner space of the housing beyond the animal's shoulder region (e.g., scapula bone region). That is, the medium to large size animal cannot step into the housing at all. Consequently, the medium to large size animal cannot reach the food located in the removable food tray 300 located near the rear of the housing, since the head or shoulder region of the animal would press against the edges 420 defining the aperture. In the preferred embodiment, the width of the opening is in the range of 3.5 to 4 inches.

The dimensions of the housing are such that a medium to large size animal cannot reach the food located in the removable food tray 300 located near the rear of the housing without having to penetrate the interior of the housing beyond the animal's shoulder region. That is, the depth D shown in FIG. 3, is such that medium to large size animal's mouth cannot reach the food tray 300, even if when the animal's head and neck can fit through the aperture up to the shoulder region. In the preferred embodiment, the depth D is about 15 inches, where a 12" box is used a starting basis for the housing.

In the preferred embodiment, the housing is made of cardboard or another non-rigid material as to allow the edges 410 of the aperture to bend slightly when pressed against, as by a medium to large size animal attempting entry, to create a "pinching action" against the animals skin. This feature provides a disincentive for future attempts to access the feeder.

Alternatively, the housing may be made of a material other than cardboard, such as vinyl, plastic, wood, or metal, and can be rigid or non-rigid.

The invention advantageously gives the owner of both pet cats and medium to large size dogs the ability to make cat food available to the cats 24 hours a day without the cat food being consumed by the dogs.

The materials used in this invention are comparatively simple, inexpensive, and easy to manufacture. The product can advantageously be sold in an unfolded box form, as shown in FIGS. 1 and 2, to reduce shipping and storing costs and can be folded/assembled by the end user. There are no required electrical devices, thereby simplifying the invention's manufacture and use.

In operation, the feeder housing is placed on its side on any flat surface, such as a counter or table, with the elongated slit shaped opening in a horizontal position. Food is placed in the food tray. While holding the tray in a horizontal position, it is inserted through the horizontal opening of the feeder housing. Still holding the food tray in a horizontal position in one hand, the other hand rotates the cardboard feeder around the tray until the feeder opening is once again vertical. The food tray is moved to near the rear of the feeder and rests on the feeder bottom.

Removal of the food tray requires that either the feeder or an empty food tray be rotated 90 degrees such that the food tray and the feeder opening are aligned along the same axis. The tray is then removed. The position of the tray, as placed inside the feeder, is shown in FIG. 3.

What I claim as my invention is:

1. An animal feeder, comprising:
    a housing having a horizontal bottom wall, a horizontal top wall, an upwardly extending rear wall, and left and right upwardly extending sidewalls, said top and bottom walls being interconnected on three sides via the rear wall and side walls to form a box shape comprising said five sides and an interconnected front side having a vertical elongated slit shaped aperture, said aperture having dimensions that prevent access to the interior region of the housing by a medium to large animal beyond its shoulder region while allowing access by a smaller animal beyond its shoulder region so that only the smaller animal can step into the interior region of the housing through the aperture,
    wherein a front wall to rear wall dimension of the housing is such that a quantity of food can be placed within the housing on the bottom wall near the rear wall and a medium to large animal cannot reach the food with its mouth, even when the animals head fits into the aperture.

2. The animal feeder of claim 1, wherein the housing is comprised of a cardboard box modified to include the vertical elongated slit shaped aperture.

3. The animal feeder of claim 2, wherein the cardboard box includes top, bottom, left, and right flaps, hingedly connected to a front and back of each respective top, bottom, left, and right side, the top and bottom flaps being affixed to corresponding left and right flaps to form the front and rear walls.

4. The animal feeder of claim 2, wherein the vertical elongated slit shaped aperture is created by modifying a top and bottom front flap of the cardboard box to support each of a left and right front flap at an angle extending outward from the interior region of the housing, thereby defining the vertical aperture by the front edges of each of the top, bottom, left, and right front flaps.

5. The animal feeder of claim 4, wherein the flaps are affixed to each other using fasteners.

6. The animal feeder of claim 5, wherein the fasteners are two-piece fasteners comprised of nylon.

7. The animal feeder of claim 5, wherein the fasteners are two-piece snap fasteners.

8. The animal feeder of claim 5, wherein the flaps are affixed to each other using adhesive.

9. The animal feeder of claim 5, wherein the flaps are affixed to each other using Velcro.

10. The animal feeder of claim 1, wherein a horizontal width of the aperture is between 3.5–4 inches.

11. The animal feeder of claim 1, wherein the front wall to rear wall dimension of the housing is approximately 15 inches.

12. The animal feeder of claim 1, wherein the housing is comprised of cardboard.

13. The animal feeder of claim 1, wherein the housing is comprised of a non-rigid material allowing surrounding edges of the aperture to bend slightly inward when pressed against.

14. The animal feeder of claim 1, wherein the housing is comprised of one of metal, plastic, or wood.

15. The animal feeder of claim 1, further comprising a tray for containing the quantity of food.

16. A foldable cardboard box adapted to fold into a housing having an aperture on one side for selective animal feeding, the cardboard box comprising:

hingedly connected bottom, top, left, and right panels, each of said panels including at least one foldable extension flap hingedly attached to a front edge of the panel and at least one foldable extension flap hingedly attached to a rear edge of the panel; and diagonal creases for forming a pair of symmetrical triangular shaped hingedly attached bendable sub-flaps at each terminal corner of each of an opposing two of the foldable extension flaps, thus providing four sub-flaps in all.

17. The foldable cardboard box of claim 16, wherein each of the flaps includes two holes, each of said holes being in cooperative alignment with a corresponding hole in a flap of an adjacent panel when the box is folded into the housing, wherein the two holes in each of the two flaps having sub-flaps are located one on each sub-flap.

18. A method of adapting a foldable cardboard box for use as a housing for selective animal feeding, the cardboard box having four panels, each panel having front and rear flaps, the method comprising the steps of:

applying diagonal creases for forming a pair of symmetrical triangular shaped hingedly attached bendable sub-flaps at each terminal corner of each of an opposing two foldable extension flaps of the cardboard box.

19. The method of claim 18, comprising the additional step of:

applying two holes in each of the flaps of the box, each of said holes being in cooperative alignment with a corresponding hole in a flap of an adjacent panel when the box is folded into the housing, wherein the two holes in each of the two flaps having sub-flaps are located one on each sub-flap.

* * * * *

UNITED STATES PATENT AND TRADEMARK OFFICE
CERTIFICATE OF CORRECTION

PATENT NO.      : 6,588,367 B1
DATED           : July 8, 2003
INVENTOR(S)     : Angus MacManus It is certified that error appears in the above-identified patent and that said Letters Patent is hereby corrected as shown below:

<u>Title page, Item 54 and Column 1, line 1,</u>
The title should be corrected to read as follows:

-- ANIMAL FEEDER THAT LIMITS ACCESS ACCORDING TO ANIMAL SIZE --

<u>Title page,</u>
Item [57], ABSTRACT,
The Abstract should be corrected to read as follows:

-- An animal feeder for small animals that physically restricts access to food by medium to large size animals is provided. A box-like housing of the feeder includes an elongated front side having a vertical slit-shaped opening. The food is placed inside near the rear wall. The size and shape of the front opening functions as a physical barrier to medium to large size animals while allowing full access to the interior of the housing by small animals. The depth of the housing is such that the distance from the opening to the food is sufficient to prevent larger animals from reaching the food with their head. --

Signed and Sealed this

Seventh Day of October, 2003

JAMES E. ROGAN
*Director of the United States Patent and Trademark Office*